(12) United States Patent
Stumpf

(10) Patent No.: US 12,503,141 B2
(45) Date of Patent: Dec. 23, 2025

(54) STREAMLINED PROPOSAL FOR REMOTE ASSISTANCE SYSTEM OF AN AUTONOMOUS VEHICLE

(71) Applicant: GM Cruise Holdings LLC, San Francisco, CA (US)

(72) Inventor: Katherine Mary Stumpf, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 237 days.

(21) Appl. No.: 18/359,691

(22) Filed: Jul. 26, 2023

(65) Prior Publication Data

US 2025/0033673 A1    Jan. 30, 2025

(51) Int. Cl.
*B60W 60/00* (2020.01)
*B60W 50/00* (2006.01)

(52) U.S. Cl.
CPC ...... *B60W 60/005* (2020.02); *B60W 50/0097* (2013.01); *B60W 60/001* (2020.02); *B60W 2552/53* (2020.02); *B60W 2554/4029* (2020.02); *B60W 2554/4045* (2020.02); *B60W 2555/20* (2020.02); *B60W 2556/45* (2020.02); *B60W 2756/10* (2020.02)

(58) Field of Classification Search
CPC ............. B60W 60/005; B60W 60/001; B60W 50/097; B60W 2554/4029; B60W 2552/53; B60W 2756/10; B60W 2556/45; B60W 2555/20; B60W 2554/4045
See application file for complete search history.

(56) References Cited

U.S. PATENT DOCUMENTS

| | | | |
|---|---|---|---|
| 11,755,008 B2* | 9/2023 | Cesafsky | G06N 20/00 701/23 |
| 12,077,181 B1* | 9/2024 | Costantino | B60W 60/0011 |
| 12,158,756 B1* | 12/2024 | Mertens | G05D 1/2279 |
| 2017/0192423 A1* | 7/2017 | Rust | G05D 1/0212 |
| 2022/0113737 A1* | 4/2022 | Kobayashi | G05D 1/0011 |
| 2024/0036571 A1* | 2/2024 | Goldman | G06Q 10/063112 |

* cited by examiner

*Primary Examiner* — Peter D Nolan
*Assistant Examiner* — Mikko Okechukwu Obioha
(74) *Attorney, Agent, or Firm* — CANTOR COLBURN LLP

(57) ABSTRACT

Systems and techniques are provided for streamlining a proposal for a remote assistance system of an autonomous vehicle (AV) based on contextual similarities in remote assistance sessions that are associated with a set of AVs. An example process includes receiving a request for remote assistance from an AV in a scene and identifying a context associated with the AV. The context includes at least one of contextual factor(s) of the scene, AV characteristics, and task(s) associated with the request. The example process includes comparing the context associated with the AV with one or more contexts associated with one or more sessions associated with a set of AVs, determining a similarity between the context associated with the AV and the one or more contexts associated with the one or more sessions, and determining one or more proposals for the request based on the similarity.

16 Claims, 8 Drawing Sheets

STREAMLINED PROPOSAL FOR REMOTE ASSISTANCE SYSTEM OF AN AUTONOMOUS VEHICLE

BACKGROUND

1. Technical Field

The present disclosure generally relates to a remote assistance system. For example, aspects of the present disclosure relate to techniques and systems for streamlining a proposal for a remote assistance system of an autonomous vehicle based on contextual similarities in remote assistance sessions that are associated with a set of autonomous vehicles.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at specific locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
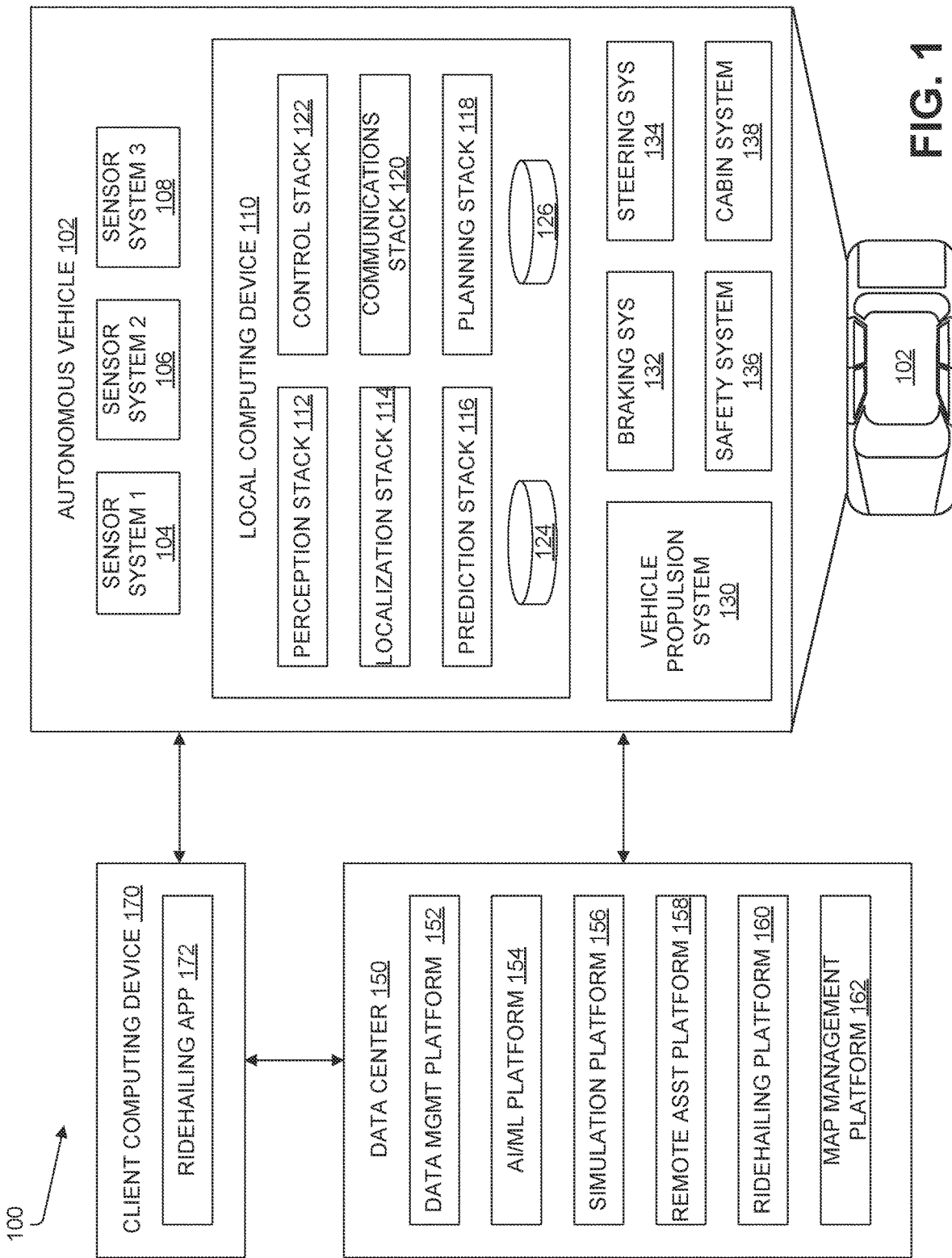
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

As previously described, an autonomous vehicle (AV) is a motorized vehicle that does not require a human driver. An AV is equipped with various sensors to perceive the surrounding environment and navigate. In some instances, an AV system may encounter an object or scenario (e.g., unfamiliar or challenging objects or ambiguous scenarios) that may inhibit the operation of the AV, and therefore, additional guidance is desired during the decision-making process. A remote operator (e.g., a human operator, a remote assistant, or a remote advisor) may be connected to an AV through a remote assistance system that facilitates communication between the remote operator and the AV for remote assistance or control. For example, a remote assistance system allows the remote operator to receive sensor data from the AV (e.g., live video feeds, sensor readings and measurements, diagnostic information, etc.) so that the remote operator can provide guidance, instructions, or interventions to the AV.

A remote operator is responsible for monitoring and providing support to an AV that is in complex or unfamiliar situations. If an AV encounters a situation it cannot handle on its own, a remote operator assesses the situation and takes appropriate action, which may involve providing instructions to the AV (e.g., to lane change, to re-route, to change a mode of operation, etc.). A remote operator needs to fully understand the scene and make decisions (or select one or more actions/recommendations that can assist the AV) to provide timely guidance. However, it can be challenging and time-consuming for a remote operator to analyze a variety of data and select an appropriate action to recommend to an AV, especially if a remote assistance request involves a complex scenario or corner case and time is of the essence to resolve the situation. Additionally, certain technical expertise may not be possessed by all remote operators to select the most appropriate method of assistance first or at all.

Systems, apparatuses, processes (also referred to as methods), and computer-readable media (collectively referred to as "systems and techniques" or "system") are described herein for streamlining a proposal for a remote assistance system associated with an AV based on contextual similarities in remote assistance sessions associated with a set of AVs. For example, the systems and techniques can compare a context associated with an AV, which needs remote assistance, and context(s) associated with remote assistance sessions where remote assistance was provided to a set of AVs. Based on a similarity between the context associated with the AV and the context(s) associated with remote assistance sessions of the set of AVs, the systems and techniques can provide one or more actions or recommendations that a remote operator can select for AV guidance.

In some examples, in order to determine a context of an AV, the systems and techniques can assess contextual factors of the scene (e.g., contextual cues such as information in the scene, a position of the AV, a position of tracked objects in the scene, a relationship between the AV and one or more objects in the scene, semantic cues in the surrounding physical environment, etc.), characteristics of the AV (e.g., an occupancy status of the AV, capabilities of the AV, historical behavior of the AV, etc.), tasks associated with the remote assistance request (e.g., object detection, object classification, localization of the AV, determining a maneuver of the AV, determining a mode of operation of the AV, planning a path of the AV, predicting a path of an object in the scene, etc.), and so on.

In some approaches, the systems and techniques can arrange one or more recommendations in a rank based on the similarity between the context associated with an AV and context(s) associated with the remote sessions associated with a set of AVs, a success rate of the remote assistance previously provided in the one or more remote assistance sessions associated with the set of AVs, and so on. For example, the systems and techniques can rank an action or recommendation based on the success rate of such action provided to a set of AVs in the past such that a remote operator can prioritize and select the one with a high success rate and therefore, reduce the resolution time.

In some aspects, the systems and techniques can present or display one or more actions or recommendations on a remote assistance interface for a remote operator to view. For example, a graphical user interface at a remote operator's device can present one or more recommendations that a remote operator can select (e.g., by clicking or pressing, etc.) one of the recommendations. The selected recommendation can be transmitted to an AV for guidance. In some cases, a remote operator can evaluate the one or more recommendations and provide input (e.g., what is needed to carry out the recommendations) regardless of whether it is selected or not selected. In some examples, the visual representations of the recommendation(s) on a remote assistance user interface can include detailed information on the similarity between the context associated with an AV and context(s) associated with the remote assistance sessions associated with a set of AVs, a success rate of the remote assistance provided in remote assistance sessions associated with a set of AVs, a reasoning for recommendation(s), and so on.

In some examples, AV data (e.g., of an AV that needs remote assistance) and data associated with a set of AVs that have remote assistance can be processed by a machine learning model to determine one or more recommendations for an AV that needs remote assistance. For example, a machine learning model can process the AV data and the data associated with the set of AVs to analyze contexts, similarities, and a success rate of the remote assistance provided to the set of AVs and output recommendations for the AV and/or a remote operator accordingly.

Aspects of the disclosed technology can improve the safety and performance of an AV by providing a streamlined proposal (or presenting a streamlined proposal on a remote assistance UI) for a remote operator and reducing the remote operator's resolution time for remote assistance. For example, the systems and techniques can provide improvements to a remote assistance UI by allowing a remote operator to more quickly understand an issue and choose an appropriate and timely response based on an analysis of remote assistance sessions that are associated with a set of AVs.

Various examples of the systems and techniques described herein for streamlining proposals for a remote assistance system based on contextual similarities in remote assistance sessions associated with a set of AVs are illustrated in FIG. 1 through FIG. 7 and described below.

FIG. 1 is a diagram illustrating an example autonomous vehicle (AV) environment 100, according to some examples of the present disclosure. One of ordinary skill in the art will understand that, for AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

Prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

Planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

Control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

Communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

Data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ride-hailing service (e.g., a ridesharing service), a delivery service, a remote/roadside assistance service, street services (e.g., street mapping, street patrol, street cleaning, street metering, parking reservation, etc.), and the like.

Data center 150 can send and receive various signals to and from the AV 102 and the client computing device 170. These signals can include sensor data captured by the sensor systems 104-108, roadside assistance requests, software updates, ride-hailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ride-hailing platform 160, and a map management platform 162, among other systems.

Data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ride-hailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

Simulation platform 156 can enable testing and validation of the algorithms, machine learning models, neural networks, and other development efforts for the AV 102, the remote assistance platform 158, the ride-hailing platform 160, the map management platform 162, and other platforms and systems. Simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

Ride-hailing platform 160 can interact with a customer of a ride-hailing service via a ride-hailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 172. The client computing device 170 can be a customer's mobile computing device or a computing device integrated with the AV 102 (e.g., the local computing device 110). The ride-hailing platform 160 can receive requests to pick up or drop off from the ride-hailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ride-hailing platform 160 may incorporate the map viewing services into the ride-hailing application 172 (e.g., client application) to enable passengers to view the AV 102 in transit en route to a pick-up or drop-off location, and so on.

While the AV 102, the local computing device 110, and the AV environment 100 are shown to include certain systems and components, one of ordinary skill will appreciate that the AV 102, the local computing device 110, and/or the AV environment 100 can include more or fewer systems and/or components than those shown in FIG. 1. For example, the AV 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

Figure 2:
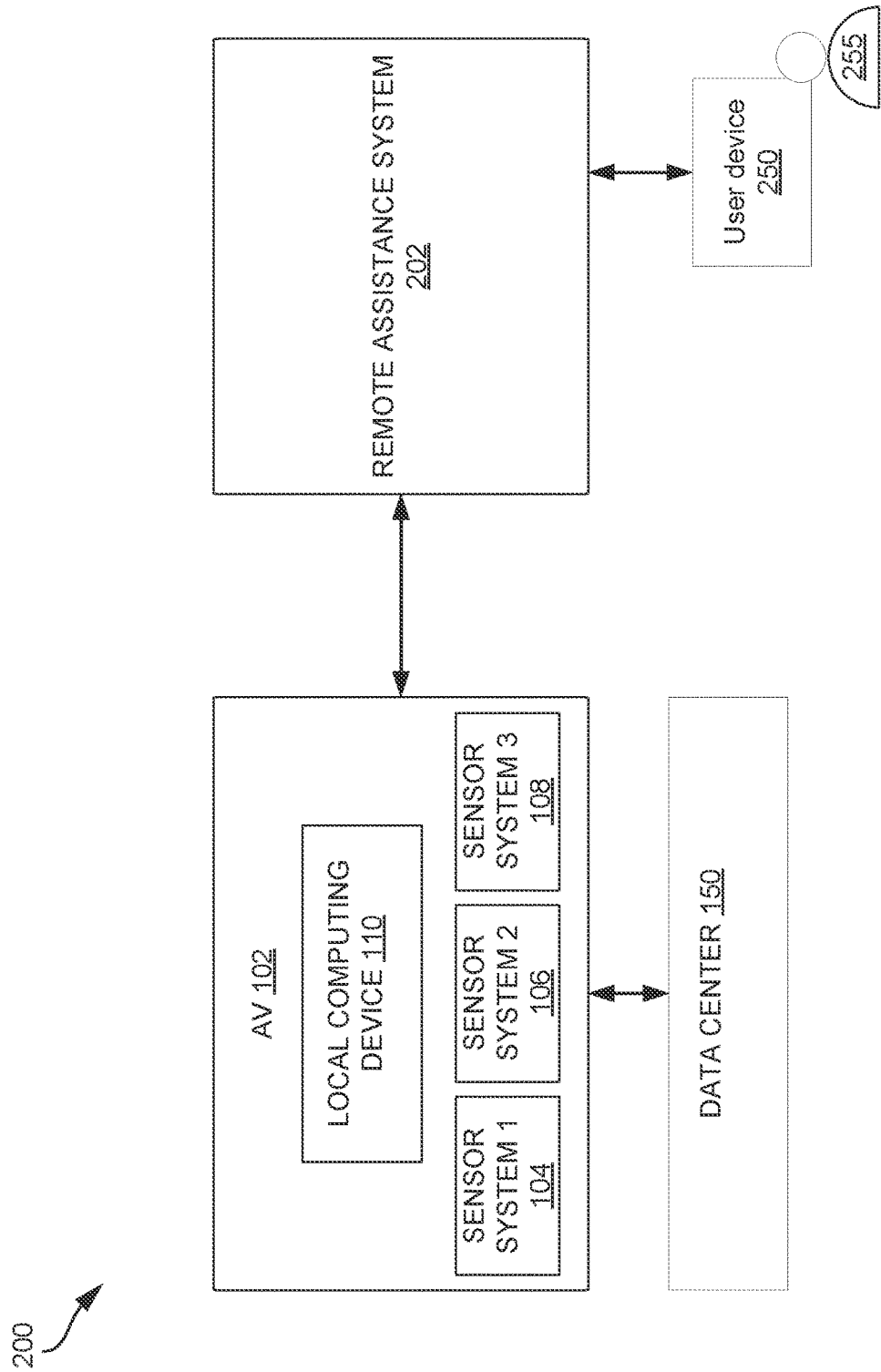
FIG. 2 is a diagram illustrating an example system environment in which an AV is in communication with a remote assistance system, according to some examples of the present disclosure.

FIG. 2 illustrates an example system environment 200 in which AV 102 is in communication with a remote assistance system 202 (e.g., remote assistance platform 158 as illustrated in FIG. 1 or also referred to as a remote computing system). In some examples, remote assistance system 202 and AV 102 may establish a network connection (e.g., via Wi-Fi network, a vehicle-to-vehicle (V2V) network, a cellular network, a satellite network, or any applicable network) to facilitate data exchange and communication. While FIG. 2 depicts a single AV 102 in communication with remote assistance system 202, other examples of remote assistance system 202 may be utilized for multiple different AVs.

In the example system environment 200, remote assistance system 202 is configured to provide remote assistance to an AV (e.g., AV 102) that has encountered a scenario in which AV 102 needs remote assistance and/or is unable to handle the situation with sufficient confidence and/or without human assistance. For example, if AV 102 encounters an object that it cannot identify or AV 102 is unable to select appropriate maneuvers or plan a course of actions due to sensor failure or environmental hazards, a remote assistance request can be generated and transmitted to remote assistance system 202. Non-limiting examples of a cause that may initiate a remote assistance request may include sensor impairment (e.g., sensor failure, sensor malfunctioning, etc.); control system failure; AV operation impairment (e.g., engine problems, a flat tire, etc.); perception, prediction, and/or planning impairment (e.g., an unidentifiable object in the scene, an object blocking a view and path of the AV, etc.); vehicle rules/constraints; scene conditions; a type of scene; one or more scene features (e.g., intersection, merge lane, closed lane/road, construction zone, obstacles, etc.); and so on.

In some aspects, remote assistance can be manually requested by an occupant of AV 102 or any other party that may be associated with AV 102. Upon receiving a request for remote assistance from AV 102, remote assistance system 202 can assign a remote operator 255 to assist AV 102. In other aspects, the AV can automatically request assistance from remote assistance system 202, or remote assistance system 202 can determine that AV 102 needs assistance in a given context/situation.

In some cases, remote assistance system 202 may access (and/or receive) various data, which can provide information associated with AV 102 and the scene. For example, remote assistance system 202 can access a variety of data that is stored in AV operational database 124 and/or communicated by AV 102 such as raw AV data generated by sensor systems 104-108, stacks 112-122, and/or other components of AV 102 (e.g., HD LIDAR point cloud data, image data, RADAR data, GPS data); log data; other AV data; and/or data received by AV 102 from remote systems (e.g., data center 150 or client computing device 170) as illustrated in FIG. 1.

Non-limiting examples of data that may be accessible (and/or received) by remote assistance system 202 can include sensor data captured by one or more sensors of AV 102 (e.g., sensor system 1 104, sensor system 2 106, sensor system 3 108), historical data associated with AV 102 (e.g., maintenance history, vehicle or accident history, a historical behavior of AV 102, etc.), profile data associated with AV 102 (e.g., state of AV 102 such as occupancy status, make, model, dimensions, etc.), operation data associated with AV 102 (e.g., mode of operation running on AV 102, information about operation systems of AV 102, operating parameters, etc.), map data (e.g., geospatial information from map management platform 162, road geometry, lane geometry, locations and directions of traffic lanes, traffic zones (e.g., construction zone, school zone, etc.), road features (e.g., signage features, traffic lights, buildings, or other objects, etc.), traffic data, weather data, logged data from AV 102, scene data, planning data, AV predictions, AV detections, AV constraints, activity data, status data, etc.

In some examples, remote assistance system 202 can generate a remote assistance user interface (UI) that includes information relating to the data available to remote assistance system 202 about AV 102 as described above. For example, remote assistance system 202 can generate a UI to be presented at user device 250 for remote operator 255. The remote operator 255 can access information in the remote assistance UI to understand the surrounding environment of AV 102, understand the need for assistance, analyze the situation associated with a remote assistance request, determine what assistance can or should be provided to AV 102, monitor AV 102, and/or provide assistance to AV 102.

In some cases, the remote assistance UI can include one or more output elements such as a display element (e.g., a screen, a touch-sensitive screen or panel, or any suitable display, etc.). For example, the remote assistance UI can include a visual/graphical representation of the scene and AV 102 (e.g., a graphical overlay over the video or image data to display). As follows, the remote assistance UI can enable remote operator 255 to view and assess available data on user device 250.

In some aspects, the remote assistance UI can include one or more input elements (e.g., a keyboard, a mouse, a tablet, a microphone, or any suitable input device). As follows, remote operator 255 can determine or select one or more remote assistance actions or instructions for a remote assistance request and provide input via an available input element of the remote assistance UI. The input from remote operator 255 can be transmitted to AV 102 for guidance/instructions (e.g., instructions to perform the one or more remote assistance actions). For example, remote operator 255 may provide input, via one of the input elements, to have an AV software stack switch between different planners (or select, via one of the input elements, a type of planners that an AV software stack to run) that make use of the respective algorithms to generate and execute a path. Further details of the remote assistance UI are described with respect to FIGS. 4A and 4B below.

In some approaches, remote assistance system 202 may be implemented using any applicable processing system and/or device such as one or more processors or controllers similar to processor-based system 600 as described below with respect to FIG. 7.

Figure 3:
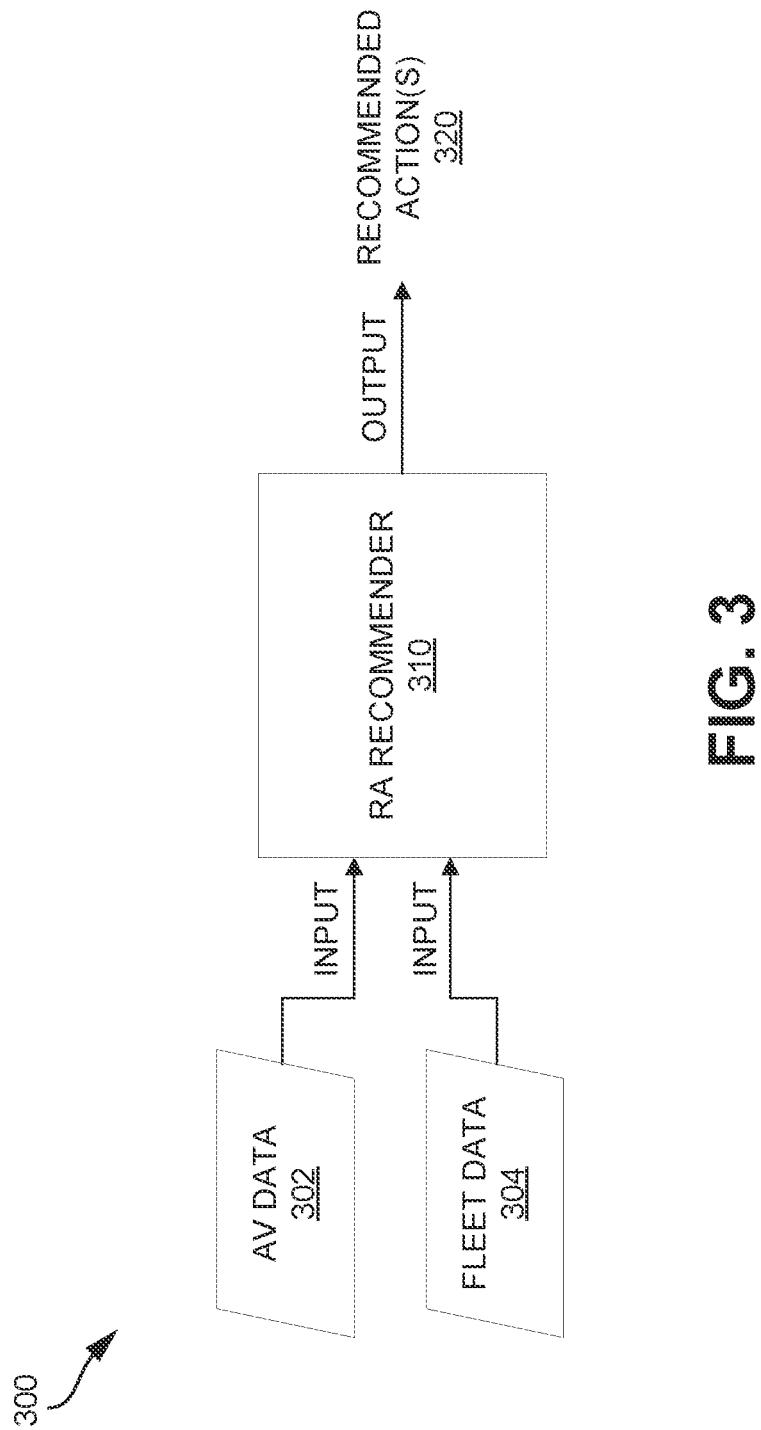
FIG. 3 is a diagram illustrating an example system for streamlining recommendations for remote assistance based on contextual similarities in remote assistance sessions, according to some examples of the present disclosure.

FIG. 3 illustrates an example system 300 for streamlining recommendations for remote assistance based on contextual similarities in remote assistance sessions. As shown, remote assistance (RA) recommender 310 can generate recommended action(s) 320 based on AV data 302 and fleet data 304. In some examples, RA recommender 310 can be implemented in remote assistance system 202 to generate recommended action(s) 320, which then can be provided to a remote assistance UI at user device 250 for remote operator 255 to view.

The RA recommender 310 may receive AV data 302 that is associated with a remote assistance request and an AV (e.g., AV 102) that is associated with the remote assistance request. For example, AV data 302 can include data relating to a remote assistance event experienced by an AV and/or a remote assistance request from the AV. In some examples, AV data 302 can include information about a remote assistance request such as a cause or issue that initiated the remote assistance request, a type of task required for a remote assistance request (e.g., getting an AV out of a stuck zone, identifying an unrecognizable object in a scene, predicting a trajectory of an unknown object, determining an unidentifiable status of a traffic light, determining a maneuver around an oncoming emergency vehicle, etc.), a timestamp indicating the time when the remote assistance request is transmitted or received, and so on.

In some aspects, AV data 302 can include data that is received from or captured by the AV (e.g., AV 102) in real-time (or near real-time), at specific intervals, on-demand, and/or at any other time. The data can include raw sensor data (e.g., image data such as a video feed and/or a still image(s) of the scene and/or the AV, LIDAR data, RADAR data, time-of-flight data, sound/audio data, sensor readings and measurements, log data, perception outputs, planning data, map data, predictions, software stack outputs, state information, assistance request information, error data, event data, etc.) and processed sensor data (e.g., a camera view with object detection labels or classifications, three-dimensional renderings of the scene, a location of the AV overlaid on a map, a predicted trajectory of objects in the scene, a planned path of the AV, etc.).

As stated above, AV data 302 can include data that is received from or captured by the AV in real-time, at specific intervals, on-demand, and/or at any other time. For example, RA recommender 310 may receive AV data 302 that is captured prior to the receipt of the remote assistance request or before the remote assistance request was made (e.g., 5 seconds before the request was made). As follows, RA recommender 310 and/or a remote operator may have additional understanding of the context associated with the AV.

In some cases, AV data 302 can include information about one or more characteristics of an AV (e.g., AV 102). For example, AV data 302 can provide details of the characteristics, features, attributes, capabilities (or limitations), or state of the AV such as vehicle class, vehicle make, vehicle model, vehicle color, cargo carried by a vehicle, occupancy state of the AV, services provided by the AV, types of hardware and/or software components, sensor information, operating system information, a mode of operation, etc.). In some examples, AV data 302 can provide information about AV's characteristics that may be related to internals of the AV. For example, AV data 302 can provide details of AV's internals such as AV's choice of certain trajectories, whether the AV is reporting certain topics as true or false. As follows, such details of the AV's internals can be taken into account by RA recommender 310 in determining a context associated with the AV.

Based on AV data 302, RA recommender 310 may determine a context associated with the AV. For example, the context associated with the AV can provide information about road features/scene features of a scene (e.g., type of road/lane, size/configuration of road/lane, the directionality of road/lane, intersection, cross-walk, static or dynamic actors in the scene, etc.), an environmental condition of a scene (e.g., a traffic condition, a traffic condition, a weather condition, a lighting condition, speed limit of the road, etc.), the situation in which the AV has encountered and triggered the remote assistance request, relationship between the AV and other actors in the scene, etc.

In some cases, fleet data 304 can include information about previous remote assistance session(s) associated with a set of AVs (e.g., a fleet of AVs). For example, fleet data 304 can include, for each remote assistance session, data relating to a remote assistance request (e.g., a cause or issue that initiated the remote assistance request, a type of task required for a remote assistance request, etc.). In some aspects, fleet data 304 can provide data associated with the resolution of the remote assistance request such as information associated with a process of the resolution, results of the resolution, feedback from a remote assistance after the resolution of the remote assistance request, etc. For example, fleet data 304 can include an amount of time that has taken to resolve the remote assistance request, a timestamp indicating the time when the remote assistance request is transmitted/received, a timestamp indicating the time when the remote assistance request is completed, whether a recommended action suggested by a remote assistance was able to resolve the remote assistance request, a satisfaction level of a remote assistant, an or input provided by a remote assistant or a remote assistant's activity detected on a remote assistance UI during the resolution time, etc.

In some approaches, fleet data 304 can include, for each remote assistance session, data received from or captured by an AV in the set of AVs associated with the respective remote assistance session (e.g., raw sensor data, processed sensor data, etc.) and data relating to one or more characteristics of the AV in the set of AVs associated with the respective remote assistance sessions.

Based on fleet data 304, RA recommender 310 may determine context(s) associated with each of the one or more remote assistance sessions(s) associated with the set of AVs. For example, the context(s) associated with remote assistance sessions(s) associated with the set of AVs can provide detailed information about the scene such as road features/scene features of a scene (e.g., type of road/lane, size/configuration of road/lane, the directionality of road/lane, intersection, cross-walk, static or dynamic actors in the scene, speed limit of road, etc.), an environmental condition of a scene (e.g., a traffic condition, a traffic condition, a weather condition, a lighting condition, etc.), the situation in which the AV has encountered and triggered the remote assistance request, relationship between the AV and other actors in the scene, etc.

In some cases, RA recommender 310 may determine, based on AV data 302 and fleet data 304, similarities (or dissimilarities) between the context associated with AV 102 and the context(s) associated with the one or more remote assistance sessions associated with the set of AVs (e.g., a fleet of AVs). For example, RA recommender 310 can compare, based on AV data 302 and fleet data 304, one or more contextual factors of the scene/situation, one or more AV characteristics (e.g., features, attributes, capabilities (or limitations), or state of the AV, internals of the AV, etc.) and/or one or more tasks associated with a remote assistance request such as scene features (e.g., traffic, traffic lights, intersections, traffic rules, obstacles, roads/lanes, road/lane geographies, road/lane directionality, congestion, weather, type of scene, etc.) of the AV and features of one or more scenes associated with the one or more sessions, a maneuver associated with the context of the AV and one or more maneuvers associated with the one or more sessions, a type(s) of AV involved in the one or more sessions, capabilities of the AV and capabilities of the AVs associated with the one or more sessions, a cause/trigger for the remote assistance request associated with the AV and a cause/trigger for one or more remote assistance requests associated with the one or more sessions, an estimated solution for the remote assistance request and one or more solutions for the one or more sessions, a state of the AV and a state of one or more AVs in the one or more sessions, an event and/or condition associated with the AV and an event and/or condition associated with the one or more sessions, etc. Based on the comparison, RA recommender 310 can identify remote assistance sessions that may be similar (or has a similarity value that exceeds a threshold) in a context. The RA recommender 310 can evaluate what was done to resolve the remote assistance request in the remote assistance sessions that have a context similar to the context of AV 102.

In some aspects, the similarity between the context associated with AV 102 and the context(s) associated with the one or more sessions associated with the set of AVs can be represented in metric (e.g., a score, a percentage, etc.) by evaluating and comparing one or more contextual factors of the scene/situation, one or more AV characteristics, and/or one or more tasks associated with a remote assistance request.

In some examples, each factor (e.g., contextual factors such as road features, scene features, an environmental condition, etc., AV characteristics, task(s) associated with a remote assistance request, etc.) can be weighted in determining a similarity (or a level of similarity). For example, each factor can include weights or biases based on the importance of the factors in determining the context similarity and providing recommended action(s) to resolve the remote assistance request.

In some approaches, RA recommender 310 may generate recommended action(s) 320 based on the similarity between the context associated with AV 102 and the context(s) associated with the remote assistance sessions associated with the set of AVs. For example, RA recommender 310 may output recommended action(s) 320 that had been successful in the past remote assistance sessions that may have a context similar to the context of AV 102 so that a streamlined proposal with recommended action(s) 320 can be provided to a remote assistant (e.g., remote operator 255).

In some aspects, RA recommender 310 may generate recommended action(s) 320 that advise against certain actions (e.g., actions that had led to a failure of resolving a remote assistance request in the past, had caused an unsafe event (e.g., a safety critical event such as a collision, a near miss, a breakdown of the AV, etc.), had caused a delayed or longer resolution time and so on). For example, if a certain action (or a course of actions) in a similar context has a zero or low successful rate (e.g., lower than a success threshold) or a high failure rate (e.g., higher than a failure threshold), RA recommender 310 may include a recommendation not to take such action.

In some examples, RA recommender 310 may take into account the actions that were taken by a remote operator in the previous remote assistance sessions when determining the contextual similarities and generating recommended action(s) 320. For example, if a remote operator had taken an action or sub-action, which previously caused a longer resolution time, a failure of resolving the remote assistance request, an unsafety of the AV and/or its surroundings, etc., RA recommender 310 may provide a recommendation to either cancel such action (or sub-action) and/or replace such action (or sub-action) with another action that is calculated/determined based on the current evolving situation of the AV.

In some cases, RA recommender 310 may, for each of recommended action(s) 320, determine whether the recommended action may be prevented or cannot be carried out due to capabilities of AV 103 (e.g., software capabilities, maneuver capabilities, hardware capabilities, navigation capabilities, perception capabilities, etc.). For example, if one of available planners of an AV is not capable of driving in a reverse direction, RA recommender 310 may remove or deactivate (e.g., prevent from being selected by a remote assistant) the recommended action of switching to the such planner when a portion of a path of AV 102 requires the AV 102 to drive in a reverse direction.

In some aspects, RA recommender 310 may arrange the recommended action(s) 320 in a rank based on the similarity in a context and/or successfulness (e.g., a success rate or a failure rate) in the past remote assistance sessions). For example, RA recommender 310 may prioritize one of the recommended action(s) 320 that may have the highest success rate in the remote assistance sessions associated with the set of AVs. In another example, RA recommender 310 may prioritize one of the recommended action(s) 320 that may have the most similarities (or the highest similarity level).

In some examples, AV data 302 and fleet data 304 can be processed by a machine learning model to determine recommended action(s) 320. For example, a machine learning model can process AV data 302 and fleet data 304 to analyze contexts, similarities, and a success rate of the remote assistance provided to the set of AVs and output recommended action(s) 320.

Figure 4A:
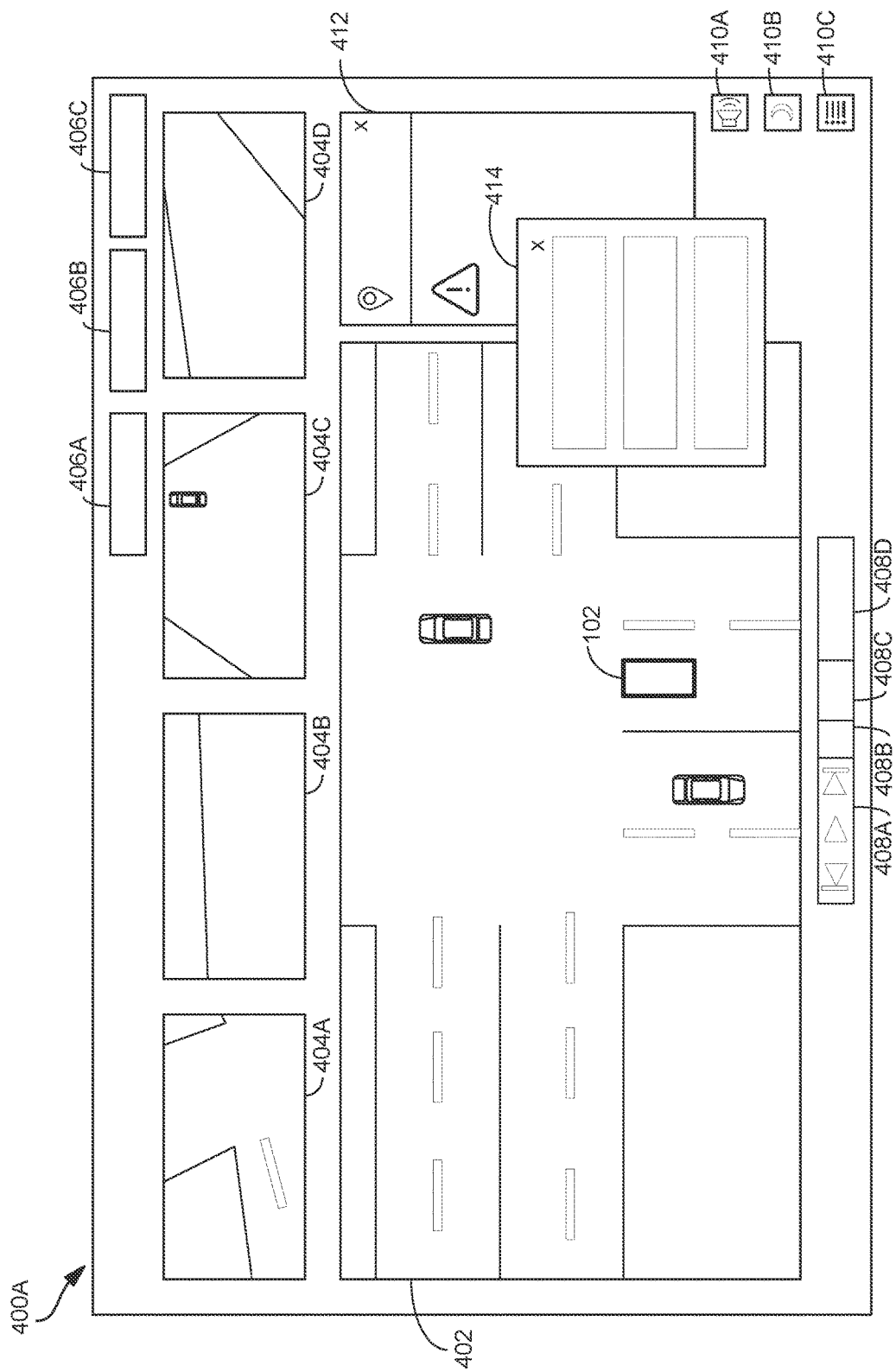
FIGS. 4A and 4B are diagrams illustrating an example user interface of a remote assistance system, according to some examples of the present disclosure.

FIG. 4A illustrates an example remote assistance user interface (UI) 400A for providing remote assistance to an AV (e.g., AV 102). For example, remote assistance system 202 can generate remote assistance UI 400A based on a variety of data from the AV. The data can include, for example and without limitation, sensor data (e.g., camera data, LIDAR data, RADAR data, ultrasonic data, time-of-flight data, gyroscope data, accelerometer data, steering wheel sensor data, etc.) captured by one or more sensors on AV 102, log data from AV 102, perception data from AV 102, status information from AV 102, map data, planning data, assistance request details, data from one or more software stacks (e.g., perception stack, planning stack, control stack, communications stack, etc.) of AV 102, and/or any other data from AV 102.

An example remote assistance UI 400A generated and/or provided by remote assistance system 202 may be displayed via user device 250 associated with remote operator 255. The remote operator 255 can interact with remote assistance UI 400A to analyze data presented in remote assistance UI 400A (e.g., data from AV 102) such as scene and AV data, request data via the remote assistance UI 400A, communicate with AV 102, provide inputs (e.g., one or more actions, suggestions, or proposals) for a task associated with a remote assistance request, control AV 102, etc.

As illustrated, remote assistance UI 400A can include a graphical/visual representation of the scene and AV 102. The remote assistance UI 400A can include a map display window 402, which includes a visual representation of the position and location of AV 102 in the scene and visual representations of road features and scene features (e.g., moving objects such as pedestrians, vehicles, bicycles, etc., static objects such as trees, buildings, etc., lane lines, road signs, traffic lights, and so on) overlaid on a map. In some examples, map display window 402 can include a planned path of AV 102 and predicted trajectories of object(s) in the scene overlaid on the map.

The remote assistance UI 400A can include sub-windows 404A-D for a graphical/visual representation of the scene or the surrounding environment in different views (e.g., bird-eye view, eye level view, AV's point of view, a front view of AV 102, a rear view of AV 102, three-dimensional view, etc.). In some examples, sub-windows 404A-D can include a video stream or still image of a portion of the scene or the surrounding environment and provide various views of the environment (e.g., video or still image captured by a front camera on AV 102, video or still image captured by a rear camera on AV 102, three dimensional (3D) image of the scene generated by a 3D rendering of image data, etc.). Accordingly, remote operator 255 can understand the position and behavior of AV 102 with respect to other features and agents in the scene based on views of the surrounding environment provided in any of the sub-windows 404A-D.

In some cases, remote assistance UI 400A can include interface elements 406A-C, 408A-D, and 410A-C that allow remote operator 255 to provide inputs for interacting with the remote assistance UI 400A and the AV. The interface elements 406A-C, 408A-D, and 410A-C can include, for example and without limitation, a playback bar, slider or a seek bar, time scale, a mute button, a volume control, a play speed, a control menu, a mode, zoom in/out, edit tools, AV control and/or interaction tools, and so on. For example, the remote operator 255 may play forward and reverse, pause, stop, to view the scene in different views at different points in time, which allows remote operator 255 to have a temporal understanding of the scene and/or a behavior of AV 102 (e.g., not only what is currently perceived by sensors on AV 102 but also what has been recently perceived).

In some aspects, remote assistance UI 400A may include a remote assistance toolbox 412, which presents a remote assistance request and detailed information about the scene/situation that initiated the remote assistance request. In some cases, remote assistance toolbox 412 can include a timestamp indicative of when the remote assistance request is received so that remote operator 255 can have a temporal understanding of the situation.

In some cases, remote assistance UI 400A may include a control menu 414, which includes one or more potential actions 416A-C (or a series of actions in a certain order) that remote operator 255 can select for remote assistance. For example, control menu 414 can present a course of available/potential actions 416A-C that can be selected by remote operator 255 (e.g., via clicking, pressing, etc.) to resolve the issue indicated in a remote assistance request. Consequently, the selected action can be transmitted to AV 102. In some examples, when an action is selected via the control menu 414, remote assistance system 202 can send a command or instruction to AV 102 to implement that action. For example, remote assistance system 202 can send a command to a software of AV 102 to trigger an operation of AV 102. As another example, remote assistance system 202 can send planning/routing/navigation instructions to AV 102 to assist AV 102.

Those skilled in the art will understand that map display window 402, sub-windows 404A-D, interface elements 406A-C, 408A-D, and 410A-C, remote assistance toolbox 412, and control menu 414 can be in any applicable number of boxes/buttons without departing the scope of the disclosed technology. The remote assistance UI 400A can be customized or dynamically adjusted (e.g., the number of display windows/sub-windows, the size of the display windows/sub-windows, the number and types of interface elements, the design of the remote assistance UI 400A, etc.) based on a remote assistance request and the data received at (or transmitted to) remote assistance system 202.

Figure 4B:
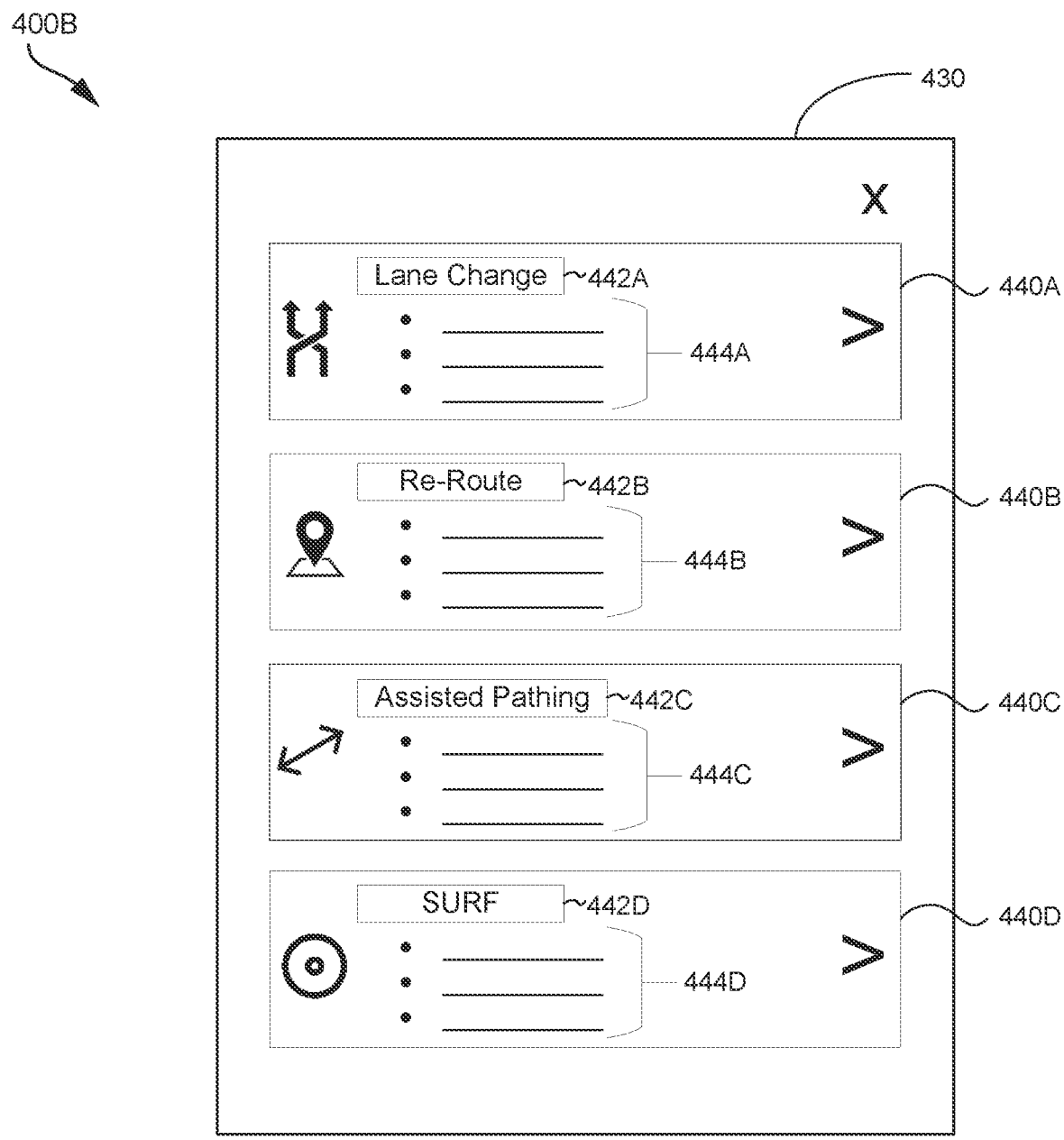

FIG. 4B illustrates an example remote assistance UI 400B for providing remote assistance to an AV (e.g., AV 102). The recommendation menu 430 (similar to control menu 414 as illustrated in FIG. 4A) can be designated for a remote action selection. For example, recommendation menu 430 can include one or more potential remote assistance actions 440A-D. Each potential remote assistance action 440A-D can include action bars 442A-D and information list 444A-D.

In some examples, information list 444A-D can provide descriptions of the similarity as identified at block 540, a success rate of the remote assistance provided in the one or more sessions associated with the set of AVs, a reasoning for the recommended action(s) 320, potential pros and cons for performing the recommended action(s) 320, and so on.

In some aspects, the one or more potential remote assistance actions 440A-D can be arranged in a rank based on the similarity in a context, a success rate in the past remote assistance sessions), a frequency of getting selected in the one or more sessions associated with the set of AVs, user preference, or a combination thereof. For example, if potential remote assistance action 440A has the highest success rate in the remote assistance sessions associated with the set of AVs, potential remote assistance action 440A may be placed on top and followed by one that has the next highest success rate.

In some examples, recommendation menu 430 may have one or more interface elements that represent the result or details of selecting a particular remote assistance action. The interface elements can be selectively displayed based on the input from remote operator 255. For example, if remote operator 255 hovers a cursor over a particular remote assistance action (e.g., potential remote assistance action 440A), the associated interface elements (e.g., similarities in the past remote assistance sessions, a success rate in the past remote assistance sessions, etc.) can be displayed in the overlay and be removed when the cursor is no longer hovering over the recommended action.

Figure 5:
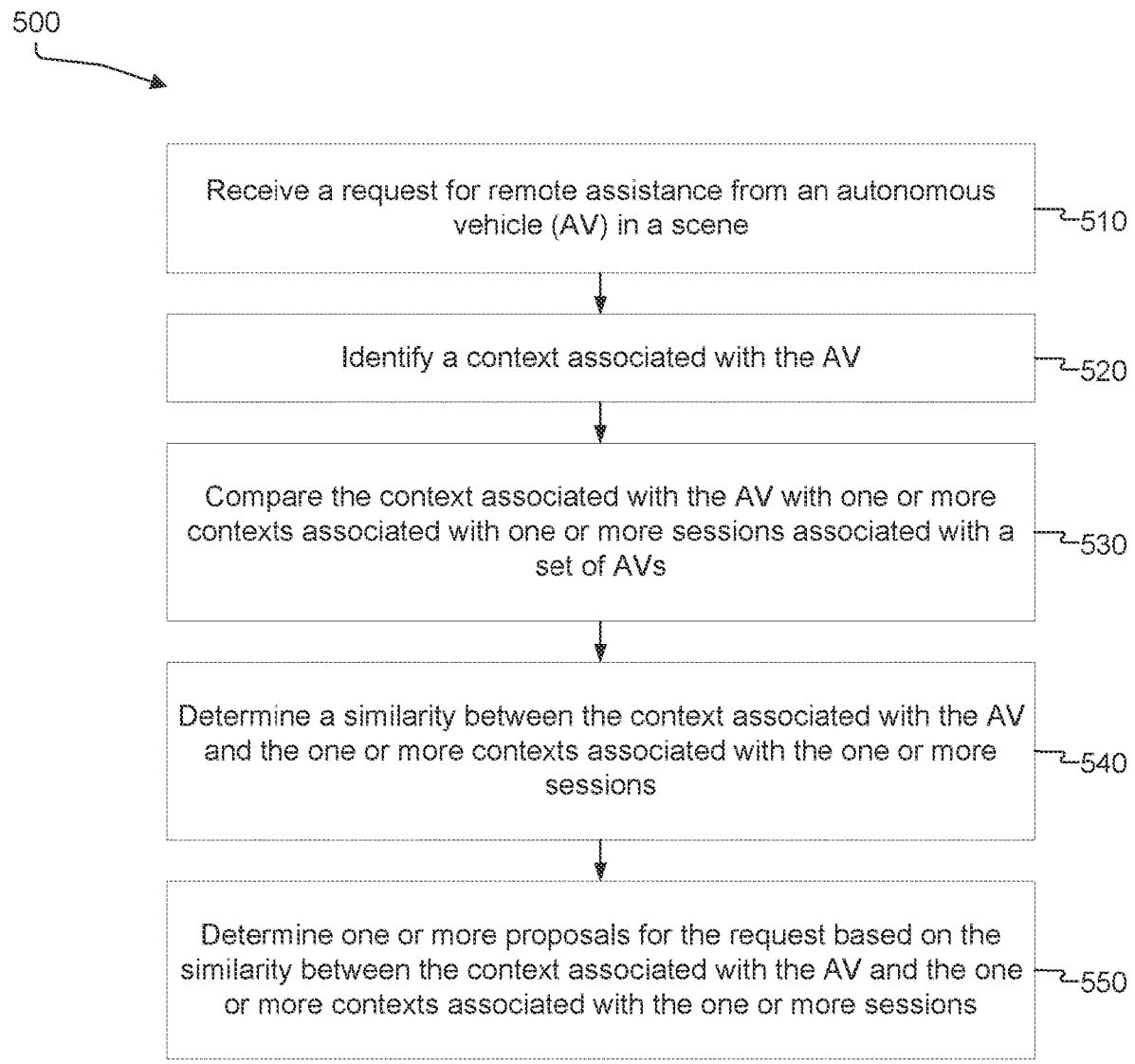
FIG. 5 is a flowchart illustrating an example process for streamlining a proposal for a remote assistance system of an autonomous vehicle based on contextual similarities in remote assistance sessions associated with a set of autonomous vehicles, according to some examples of the present disclosure.

FIG. 5 is a flowchart illustrating an example process 500 for streamlining proposals for a remote assistance system based on contextual similarities in remote assistance sessions that are associated with a set of AVs (e.g., a fleet of AVs). Although the example process 500 depicts a particular sequence of operations, the sequence may be altered without departing from the scope of the present disclosure. For example, some of the operations depicted may be performed in parallel or in a different sequence that does not materially affect the function of process 500. In other examples, different components of an example device or system that implements process 500 may perform functions at substantially the same time or in a specific sequence.

At block 510, process 500 includes receiving a request for remote assistance from an autonomous vehicle (AV) in a scene. For example, remote assistance system 202 can receive a remote assistance request from AV 102 in a scene. In some examples, a remote assistance request can be manually requested by an occupant of AV 102 or any other party that may be associated with AV 102 (e.g., a passenger of AV 102, a remote operator associated with AV 102, any human that may need remote assistance of AV 102, etc.). In other examples, AV 102 can automatically request assistance from remote assistance system 202, remote assistance system 202 can determine that AV 102 needs assistance in a given context or situation (e.g., monitoring the condition of AV 102 and detecting an issue that prompted a remote assistance request).

In some cases, the remote assistance request can include an indication of the AV requesting assistance, one or more capabilities (e.g., software capabilities, maneuver capabilities, hardware capabilities, navigation capabilities, perception capabilities, etc.) of the AV, a location of the AV, a state of the AV, a description of the reason for the AV's need for remote assistance, sensor data (e.g., image data such as video and/or images, LIDAR data, RADAR data, accelerometer data, acoustic data, time-of-flight data, steering wheel sensor data, GPS data, etc.) collected by the AV at the scene where the remote assistance request was generated and/or the assistance need arose (and/or before reaching the scene), a description of a scene of the AV, a description of a cause that triggered the AV's need for assistance, a timestamp associated with the request for remote assistance, planning information from the AV, log data, an indication of one or more navigation restrictions/constraints of the AV, and/or any other relevant information.

At block 520, process 500 includes identifying a context associated with the AV. The context can include one or more contextual factors of the scene, one or more characteristics of the AV, one or more tasks (e.g., one or more AV maneuvers, one or more AV operations, one or more AV software tasks, one or more scene/object perception tasks, one or more navigation tasks, etc.) associated with the request, and/or any other information about the scene, the AV, and/or the remote assistance request/need. For example, remote assistance system 202 (or RA recommender 310) can identify a context associated with AV 102, which may include one or more contextual factors of the scene, one or more characteristics of AV 102, and/or one or more tasks associated with the remote assistance request. The remote assistance system 202 (or RA recommender 310) can determine the context associated with AV 102 based on AV data 302, which may provide data relating to a remote assistance event experienced by the AV 102 and/or a remote assistance request, data received from or captured by AV 102 such as raw sensor data and/or processed sensor data, data relating to AV characteristics, and so on.

At block 530, process 500 includes comparing the context associated with the AV with one or more contexts associated with one or more sessions associated with a set of AVs. The one or more sessions may include one or more remote assistance sessions where remote assistance was provided to the set of AVs. For example, remote assistance system 202 (or RA recommender 310) can access and/or receive fleet data 304, which may include data associated with data received from or captured by the set of AVs (e.g., raw sensor data, processed sensor data, etc.), data relating to one or more characteristics of the set of AVs, data associated with a remote assistance request in the one or more remote assistance sessions associated with the set of AVs, and so on.

In some examples, comparing the context associated with the AV with one or more contexts associated with one or more sessions associated with a set of AVs can include comparing features of a scene (e.g., traffic, traffic lights, intersections, traffic rules, obstacles, roads/lanes, road/lane geographies, road/lane directionality, congestion, weather, type of scene, etc.) of the AV and features of one or more scenes associated with the one or more sessions, a maneuver associated with the context of the AV and one or more maneuvers associated with the one or more sessions, a type of AV of the AV and a type(s) of AV involved in the one or more sessions, capabilities of the AV and capabilities of the AVs associated with the one or more sessions, a cause/trigger for the remote assistance request associated with the AV and a cause/trigger for one or more remote assistance requests associated with the one or more sessions, an estimated solution for the remote assistance request and one or more solutions for the one or more sessions, a state of the AV and a state of one or more AVs in the one or more sessions, an event and/or condition associated with the AV and an event and/or condition associated with the one or more sessions, etc.

At block 540, process 500 includes determining a similarity between the context associated with the AV and the one or more contexts associated with the one or more sessions. For example, remote assistance system 202 (or RA recommender 310) can determine a similarity (or dissimilarity) between the context associated with AV 102 and the context(s) associated with the one or more sessions associated with the set of AVs (e.g., a fleet of AVs). In some examples, the similarity can be based on a number of matching features (and/or matching feature types) in the context associated with the AV and the one or more contexts associated with the one or more remote assistance sessions, a match and/or similarity between an event associated with the context and an event associated with the one or more contexts, AV types and/or capabilities associated with the context and the one or more contexts, a match or similarity between causes for the remote assistance request of the AV and remote assistance requests associated with the one or more contexts, a match or similarity between maneuvers associated with the context and the one or more contexts, a location associated with the AV and the one or more sessions, a match or similarity of geography associated with the context and the one or more contexts, a match or similarity between scenes associated with the context and the one or more contexts, and/or any match or similarity between the context and the one or more contexts.

At block 550, process 500 includes determining one or more proposals for the request based on the similarity between the context associated with the AV and the one or more contexts associated with the one or more sessions. For example, remote assistance system 202 (or RA recommender 310) can determine recommended action(s) 320 based on the similarity between the context associated with AV 102 and the context(s) associated with the one or more sessions associated with the set of AVs (e.g., a fleet of AVs).

In some examples, the one or more proposals can include one or more vehicle operations/maneuvers for the AV to perform in response to (e.g., to resolve/address) the remote assistance request, a sequence of actions (e.g., operations/maneuvers, etc.) for the AV to perform in response to (e.g., to resolve/address) the remote assistance request, one or more parameters for the AV to implement in response to (e.g., to resolve/address) the remote assistance request, one or more navigation plans and/or reroutes for the AV, information/data about something in the scene that the AV was unable to detect/recognize with at least a threshold confidence, one or more actions for recovering from an error/failure (e.g., a maneuver and/or navigation error/failure, a software error/failure, a hardware error/failure, a route planning error/failure, a perception error/failure, etc.), etc.

In some examples, process 500 can include presenting or displaying the one or more proposals on an interface associated with a remote assistant of the AV. The interface can include a visual representation of the scene and the AV. In some examples, the interface may include one or more input elements that can receive input from remote operator 255. For example, remote assistance system 202 (or RA recommender 310) can present the recommended action(s) 320 on a remote assistance UI 400A-B of user device 250 that is associated with remote operator 255. The remote operator 255 may view and provide input by selecting (e.g., via clicking, pressing, etc.) one or more input elements that correspond to one or more of the recommended action(s) 320.

In some examples, when recommended action(s) 320 are presented on remote assistance UI 400A-B, detailed information about the recommended action(s) 320 can be included. For example, in addition to the action bar 442A-D that indicates the title of the recommended action, information list 444A-D can provide descriptions of the similarity as identified at block 540, a success rate of the remote assistance provided in the one or more sessions associated with the set of AVs, a reasoning for the recommended action(s) 320 (e.g., why a certain action is chosen as recommended action(s) 320), potential pros and cons for performing the recommended action(s) 320, and so on.

In some cases, recommended action(s) 320 can be provided or presented/displayed on remote assistance UI 400A-B in a ranked order based on the similarity as identified at block 540, a success rate of the remote assistance provided in the one or more sessions associated with the set of AVs, a frequency of getting selected in the one or more sessions associated with the set of AVs, user preference, and so on.

In some aspects, when an input from a remote assistant (e.g., remote operator 255) is received, a remote assistance system (e.g., remote assistance system 202) can communicate the input to an AV (e.g., AV 102), which may cause the AV to perform the recommendation that is selected by the remote assistant.

Figure 6:
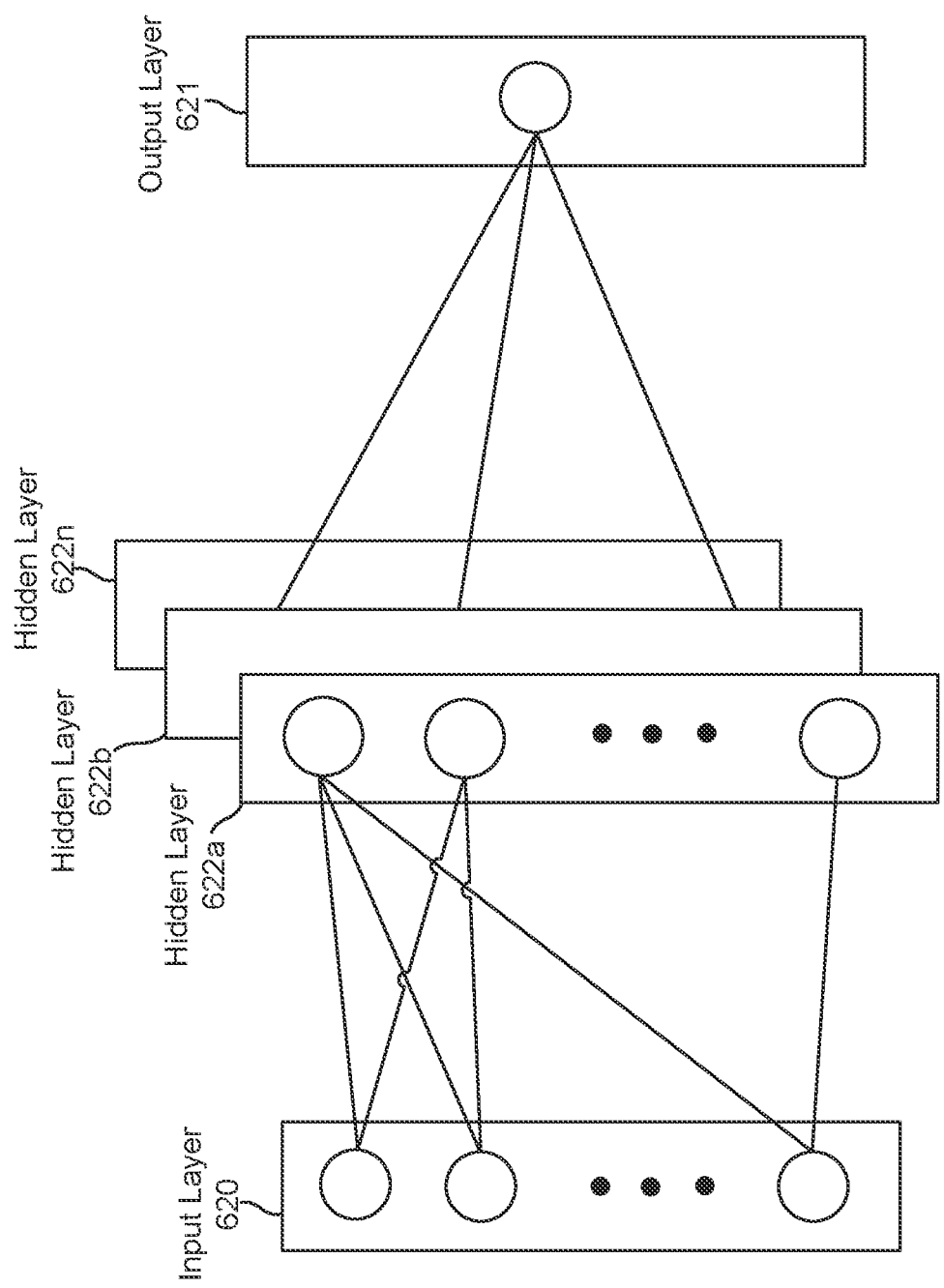
FIG. 6 illustrates an example of a deep learning neural network that can be used to implement a remote assistance recommendation module, according to some aspects of the disclosed technology.

FIG. 6 illustrates an example neural network 600 that can be used to implement all or a portion of the systems and techniques described herein (e.g., neural network 600 can be used to implement a remote assistance recommendation module such as RA recommender 310). The example neural network 600 is merely one illustrative example provided for clarity and explanation purposes. One of ordinary skill in the art will recognize that other configurations of a neural network are also possible and contemplated herein.

An input layer 620 can be configured to receive sensor data and/or data relating to an environment surrounding an AV. Neural network 600 includes multiple hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. Neural network 600 further includes an output layer 621 that provides an output resulting from the processing performed by the hidden layers 622a, 622b, through 622n.

Neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the first hidden layer 622a can transform the information of each input node by applying activation functions to the input node information. The information derived from the transformation can then be passed to and can activate the nodes of the next hidden layer 622b, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 621, at which an output is provided. In some cases, while nodes in the neural network 600 are shown as having multiple output lines, a node can have a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622a, 622b, through 622n in order to provide the output through the output layer 621.

In some cases, the neural network 600 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 600 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(½ (target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 600 can perform a backward pass by determining which inputs (weights) most contributed to the loss of the network, and can adjust the weights so that the loss decreases and is eventually minimized.

Figure 7:
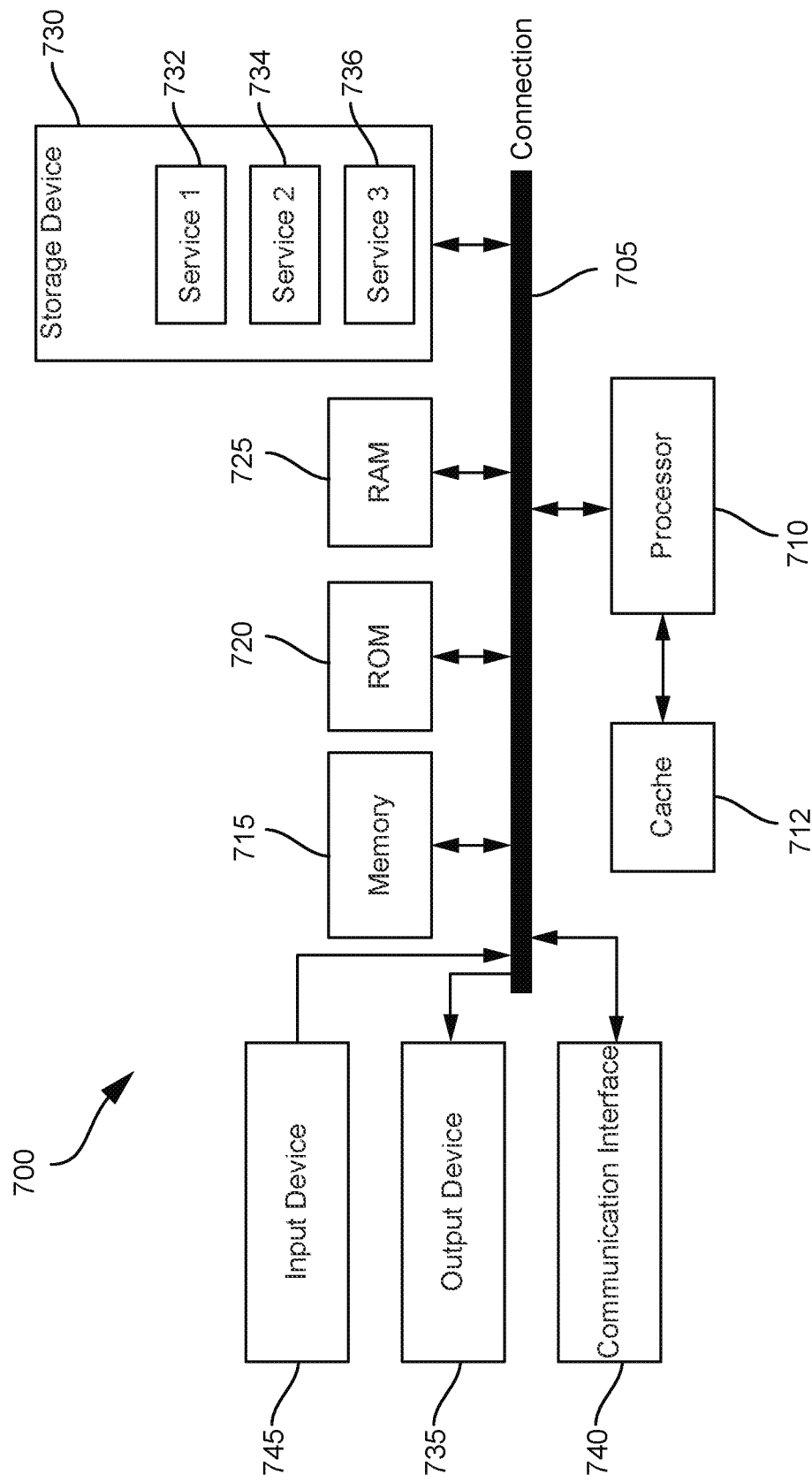
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up local computing device 110, client computing device 170, a passenger device executing the ride-hailing application 172, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communication interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some examples, a hardware service that performs a particular function can include the software component stored in a computer-readable medium in connection with the necessary hardware components, such as processor 710, connection 705, output device 735, etc., to carry out the function.

Examples within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A remote assistance system comprising: a memory; and one or more processors coupled to the memory, the one or more processors being configured to: receive a request for remote assistance from an autonomous vehicle (AV) in a scene; identify a context associated with the AV, the context comprising at least one of one or more contextual factors of the scene, one or more characteristics of the AV, and one or more tasks associated with the request; compare the context associated with the AV with one or more contexts associated with one or more sessions associated with a set of AVs, wherein the one or more sessions include one or more remote assistance sessions where remote assistance was provided to the set of AVs; determine a similarity between the context associated with the AV and the one or more contexts associated with the one or more sessions; and determine one or more proposals for the request based on the similarity between the context associated with the AV and the one or more contexts associated with the one or more sessions.

Aspect 2. The remote assistance system of Aspect 1, wherein the one or more processors are configured to: present the one or more proposals on an interface associated with a remote assistant of the AV, wherein the interface includes a visual representation of the scene and the AV.

Aspect 3. The remote assistance system of Aspects 1 or 2, wherein the one or more proposals are arranged in a rank based on at least one of the similarity between the context associated with the AV and the one or more contexts associated with the one or more sessions associated with the set of AVs and a success rate of the remote assistance provided in the one or more sessions.

Aspect 4. The remote assistance system of any of Aspects 1 to 3, wherein determining the one or more proposals for the request includes determining a capability of the AV to perform the one or more proposals for the request.

Aspect 5. The remote assistance system of any of Aspects 1 to 4, wherein the one or more contextual factors of the scene include at least one of a relationship between the AV and one or more objects in the scene, a road feature, a lane geometry, and a weather condition.

Aspect 6. The remote assistance system of any of Aspects 1 to 5, wherein the one or more characteristics of the AV include at least one of a position of the AV in the scene, an occupancy status of the AV, and a capability of the AV to perform one or more maneuvers.

Aspect 7. The remote assistance system of any of Aspects 1 to 6, wherein the one or more tasks associated with the request comprise at least one of object detection, object classification, localization of the AV, determining a maneuver of the AV, determining an operation of the AV, planning a path of the AV, and predicting a path of an object in the scene.

Aspect 8. The remote assistance system of any of Aspects 1 to 7, wherein the one or more proposals include at least one of success statistics of the remote assistance provided in the one or more sessions, a detailed description of the similarity, and a reasoning for the one or more proposals.

Aspect 9. A method comprising: receiving a request for remote assistance from an autonomous vehicle (AV) in a scene; identifying a context associated with the AV, the context comprising at least one of one or more contextual factors of the scene, one or more characteristics of the AV, and one or more tasks associated with the request; comparing the context associated with the AV with one or more contexts associated with one or more sessions associated with a set of AVs, wherein the one or more sessions include one or more remote assistance sessions where remote assistance was provided to the set of AVs; determining a similarity between the context associated with the AV and the one or more contexts associated with the one or more sessions; and determining one or more proposals for the request based on the similarity between the context associated with the AV and the one or more contexts associated with the one or more sessions.

Aspect 10. The method of Aspect 9, further comprising: presenting the one or more proposals on an interface associated with a remote assistant of the AV, wherein the interface includes a visual representation of the scene and the AV.

Aspect 11. The method of Aspects 9 or 10, wherein the one or more proposals are arranged in a rank based on at least one of the similarity between the context associated with the AV and the one or more contexts associated with the one or more sessions associated with the set of AVs and a success rate of the remote assistance provided in the one or more sessions.

Aspect 12. The method of any of Aspects 9 to 11, wherein determining the one or more proposals for the request includes determining a capability of the AV to perform the one or more proposals for the request.

Aspect 13. The method of any of Aspects 9 to 12, wherein the one or more contextual factors of the scene include at least one of a relationship between the AV and one or more objects in the scene, a road feature, a lane geometry, and a weather condition.

Aspect 14. The method of any of Aspects 9 to 13, wherein the one or more characteristics of the AV include at least one of a position of the AV in the scene, an occupancy status of the AV, and a capability of the AV to perform one or more maneuvers.

Aspect 15. The method of any of Aspects 9 to 14, wherein the one or more tasks associated with the request comprise at least one of object detection, object classification, localization of the AV, determining a maneuver of the AV, determining an operation of the AV, planning a path of the AV, and predicting a path of an object in the scene.

Aspect 16. The method of any of Aspects 9 to 15, wherein the one or more proposals include at least one of success statistics of the remote assistance provided in the one or more sessions, a detailed description of the similarity, and a reasoning for the one or more proposals.

Aspect 17. A non-transitory computer-readable medium having stored thereon instructions which, when executed by one or more processors, cause the one or more processors to perform a method according to any of Aspects 9 to 16.

Aspect 18. An autonomous vehicle comprising a computer device having stored thereon instructions which, when executed by the computing device, cause the computing device to perform a method according to any of Aspects 9 to 16.

Aspect 19. A computer-program product comprising instructions which, when executed by one or more processors, cause the one or more processors to perform a method according to any of Aspects 9 to 16.

What is claimed is:

1. A remote assistance system comprising:
   a memory; and
   one or more processors coupled to the memory, the one or more processors being configured to:
   receive a request for remote assistance from an autonomous vehicle (AV) in a scene;
   identify a context associated with the AV, the context comprising at least one of one or more contextual factors of the scene, one or more characteristics of the AV, and one or more tasks associated with the request;
   compare the context associated with the AV with one or more contexts associated with one or more sessions associated with a set of AVs, wherein the one or more sessions include one or more remote assistance sessions where remote assistance was provided to the set of AVs;
determine a similarity between the context associated with the AV and the one or more contexts associated with the one or more sessions;
determine one or more proposals for the request based on the similarity between the context associated with the AV and the one or more contexts associated with the one or more sessions, wherein the one or more proposals are arranged in a rank based on the similarity between the context associated with the AV and the one or more contexts associated with the one or more sessions associated with the set of AVs and a success rate of the remote assistance provided in the one or more sessions; and
causing the AV to perform a maneuver associated with one of the one or more proposals to control one or more actuators of the AV to control at least one of steering, a throttle, a brake, or a drive unit.

2. The remote assistance system of claim 1, wherein the one or more processors are configured to:
present the one or more proposals on an interface associated with a remote assistant of the AV, wherein the interface includes a visual representation of the scene and the AV.

3. The remote assistance system of claim 1, wherein determining the one or more proposals for the request includes determining a capability of the AV to perform the one or more proposals for the request.

4. The remote assistance system of claim 1, wherein the one or more contextual factors of the scene include at least one of a relationship between the AV and one or more objects in the scene, a road feature, a lane geometry, and a weather condition.

5. The remote assistance system of claim 1, wherein the one or more characteristics of the AV include at least one of a position of the AV in the scene, an occupancy status of the AV, and the capability of the AV to perform the one or more proposals for the request.

6. The remote assistance system of claim 1, wherein the one or more tasks associated with the request comprise at least one of object detection, object classification, localization of the AV, determining the maneuver of the AV, determining an operation of the AV, planning a path of the AV, and predicting a path of an object in the scene.

7. The remote assistance system of claim 1, wherein the one or more proposals include at least one of success statistics of the remote assistance provided in the one or more sessions, a detailed description of the similarity, and a reasoning for the one or more proposals.

8. A method comprising:
receiving a request for remote assistance from an autonomous vehicle (AV) in a scene;
identifying a context associated with the AV, the context comprising at least one of one or more contextual factors of the scene, one or more characteristics of the AV, and one or more tasks associated with the request;
comparing the context associated with the AV with one or more contexts associated with one or more sessions associated with a set of AVs, wherein the one or more sessions include one or more remote assistance sessions where remote assistance was provided to the set of AVs;
determining a similarity between the context associated with the AV and the one or more contexts associated with the one or more sessions;
determining one or more proposals for the request based on the similarity between the context associated with the AV and the one or more contexts associated with the one or more sessions, wherein determining the one or more proposals for the request includes determining a capability of the AV to perform the one or more proposals for the request; and
causing the AV to perform a maneuver associated with one of the one or more proposals to control one or more actuators of the AV to control at least one of steering, a throttle, a brake, or a drive unit.

9. The method of claim 8, further comprising:
presenting the one or more proposals on an interface associated with a remote assistant of the AV, wherein the interface includes a visual representation of the scene and the AV.

10. The method of claim 8, wherein the one or more proposals are arranged in a rank based on at least one of the similarity between the context associated with the AV and the one or more contexts associated with the one or more sessions associated with the set of AVs and a success rate of the remote assistance provided in the one or more sessions.

11. The method of claim 8, wherein the one or more contextual factors of the scene include at least one of a relationship between the AV and one or more objects in the scene, a road feature, a lane geometry, and a weather condition.

12. The method of claim 8, wherein the one or more characteristics of the AV include at least one of a position of the AV in the scene, an occupancy status of the AV, and the capability of the AV to perform the one or more proposals for the request.

13. The method of claim 8, wherein the one or more tasks associated with the request comprise at least one of object detection, object classification, localization of the AV, determining the maneuver of the AV, determining an operation of the AV, planning a path of the AV, and predicting a path of an object in the scene.

14. The method of claim 8, wherein the one or more proposals include at least one of success statistics of the remote assistance provided in the one or more sessions, a detailed description of the similarity, and a reasoning for the one or more proposals.

15. A non-transitory computer-readable medium having stored thereon instructions which, when executed by one or more processors, cause the one or more processors to:
receive a request for remote assistance from an autonomous vehicle (AV) in a scene;
identify a context associated with the AV, the context comprising at least one of one or more contextual factors of the scene, one or more characteristics of the AV, and one or more tasks associated with the request;
compare the context associated with the AV with one or more contexts associated with one or more sessions associated with a set of AVs, wherein the one or more sessions include one or more remote assistance sessions where remote assistance was provided to the set of AVs;
determine a similarity between the context associated with the AV and the one or more contexts associated with the one or more sessions;
determine one or more proposals for the request based on the similarity between the context associated with the AV and the one or more contexts associated with the one or more sessions, wherein the one or more proposals are arranged in a rank based on the similarity between the context associated with the AV and the one or more contexts associated with the one or more sessions associated with the set of AVs and a success rate of the remote assistance provided in the one or more sessions, and wherein determining the one or more proposals for the request includes determining a capability of the AV to perform the one or more proposals for the request; and causing the AV to perform a maneuver associated with one of the one or more proposals to control one or more actuators of the AV to control at least one of steering, a throttle, a brake, or a drive unit.

16. The non-transitory computer-readable medium of claim 15, wherein the instructions cause the one or more processors to:

present the one or more proposals on an interface associated with a remote assistant of the AV, wherein the interface includes a visual representation of the scene and the AV.

* * * * *